(12) United States Patent
Dittmann et al.

(10) Patent No.: US 9,897,388 B2
(45) Date of Patent: Feb. 20, 2018

(54) COMPOSITE EXHAUST GAS RECIRCULATION COOLER

(75) Inventors: Jörg Dittmann, Stuttgart (DE); Richard Jaiβle, Wernau (DE)

(73) Assignee: Mahle International GmbH (DE)

( * ) Notice: Subject to any disclaimer, the term of this patent is extended or adjusted under 35 U.S.C. 154(b) by 706 days.

(21) Appl. No.: 13/251,569

(22) Filed: Oct. 3, 2011

(65) Prior Publication Data

US 2012/0090818 A1 Apr. 19, 2012

(30) Foreign Application Priority Data

Oct. 4, 2010 (DE) .................. 10 2010 041 943

(51) Int. Cl.
| | |
|---|---|
| *F28F 21/00* | (2006.01) |
| *F28D 7/16* | (2006.01) |
| *F02B 29/04* | (2006.01) |
| *F28F 9/02* | (2006.01) |
| *F02M 26/32* | (2016.01) |
| *F28D 21/00* | (2006.01) |
| *F28F 21/08* | (2006.01) |

(52) U.S. Cl.
CPC ........ *F28D 7/1684* (2013.01); *F02B 29/0462* (2013.01); *F02M 26/32* (2016.02); *F28F 9/02* (2013.01); *F28D 21/0003* (2013.01); *F28F 21/082* (2013.01); *F28F 21/084* (2013.01); *F28F 2009/029* (2013.01); *F28F 2225/08* (2013.01); *F28F 2275/062* (2013.01); *Y02T 10/146* (2013.01)

(58) Field of Classification Search
CPC .... F28F 2275/062; F28F 9/02; F28D 21/0003

USPC ............... 165/41, 157; 123/568.12
See application file for complete search history.

(56) References Cited

U.S. PATENT DOCUMENTS

| | | | |
|---|---|---|---|
| 6,460,520 B1 * | 10/2002 | Challis | 123/568.12 |
| 6,561,263 B1 | 5/2003 | Potier et al. | |
| 8,876,214 B2 | 11/2014 | Kroener et al. | |
| 2003/0024965 A1 * | 2/2003 | Okamura et al. | 228/112.1 |
| 2006/0288694 A1 * | 12/2006 | Hayashi | 60/298 |
| 2007/0131401 A1 * | 6/2007 | Daly | B29C 65/1635 165/158 |
| 2007/0289581 A1 * | 12/2007 | Nakamura | 123/568.12 |
| 2008/0000625 A1 | 1/2008 | Baylis et al. | |
| 2008/0289804 A1 * | 11/2008 | Baumann et al. | 165/157 |

(Continued)

FOREIGN PATENT DOCUMENTS

| | | |
|---|---|---|
| DE | 102005045098 A1 | 3/2007 |
| DE | 202005021318 U1 | 8/2007 |

(Continued)

OTHER PUBLICATIONS

DE102008029114TRANS (English Translation), Dec. 2009, Germany, Winterer, Johann.*

(Continued)

*Primary Examiner* — Justin Jonaitis
*Assistant Examiner* — Eric Ruppert
(74) *Attorney, Agent, or Firm* — Fishman Stewart PLLC

(57) ABSTRACT

A cooler having a first component made of at least one of steel, stainless steel, plastic and ceramic. A second component may be made of aluminum, wherein the two components may be connected to each other in a connecting area via a friction stir weld joint.

16 Claims, 2 Drawing Sheets

(56) References Cited

U.S. PATENT DOCUMENTS

| | | | |
|---|---|---|---|
| 2008/0310116 A1* | 12/2008 | O'Connor | 361/707 |
| 2009/0056922 A1* | 3/2009 | Hemminger et al. | 165/158 |
| 2009/0277165 A1* | 11/2009 | Geskes | F02B 29/0418 60/320 |
| 2010/0025023 A1* | 2/2010 | Schmidt et al. | 165/157 |
| 2010/0071871 A1* | 3/2010 | Gaensler | F28F 9/0219 165/51 |
| 2010/0146866 A1 | 6/2010 | Nelson et al. | |
| 2011/0000952 A1* | 1/2011 | Takeshita et al. | 228/112.1 |

FOREIGN PATENT DOCUMENTS

| | | | |
|---|---|---|---|
| DE | 102007052585 B3 | 6/2009 | |
| DE | 102008029114 | * 12/2009 | |
| DE | 102009002912 A1 | 6/2010 | |
| EP | 1788341 A1 | 5/2007 | |
| JP | S59184616 U | 12/1984 | |
| JP | S62190394 A | 8/1987 | |
| JP | H07190651 A | 7/1995 | |
| JP | H11229872 A | 8/1999 | |
| JP | 2001182533 | * 7/2001 | |
| JP | 2006297437 A | 11/2006 | |
| JP | 2007313550 A | 12/2007 | |
| JP | 2009523994 A | 6/2009 | |
| JP | 2009148831 A | 7/2009 | |
| JP | 2009202212 A | 9/2009 | |
| JP | 2010158885 A | 7/2010 | |
| WO | WO 2008006604 | * 1/2008 | F02B 29/0418 |
| WO | WO-2010102947 A1 | 9/2010 | |

OTHER PUBLICATIONS

Ogata, JP2001182533MT (English Translation), Jul. 2001.*
English abstract provided for DE102005045098.
EP Search Report for EP11181907.4., dated Nov. 3, 2014.
English Abstract for JP 2009148831.
English Abstract for JP S62190394.
English Abstract for JP H07190651.
English Abstract for JP 2009202212.
English Abstract for JP 2009523994.
Office Action for JP Application No. 2011-241901, dated Mar. 10, 2015, 12 pp.
English Abstract for JP 2010158885.
English Abstract for JP 2006297437.
English Abstract for JP 2007313550.

* cited by examiner

COMPOSITE EXHAUST GAS RECIRCULATION COOLER

CROSS-REFERENCES TO RELATED APPLICATION

This application claims priority to German patent application DE 10 2010 041 943.5 filed on Oct. 4, 2010, which is hereby incorporated by reference in its entirety.

TECHNICAL FIELD

The present invention relates to a cooler, in particular an exhaust gas recirculation cooler (EGR cooler) or a charge air cooler.

BACKGROUND

Today, individual components of modern coolers are welded together so as to be able to ensure a stable and in particular tight connection of the individual components to each other. Apart from that, further cooler components are also connected to each other by other joining methods, for example by means of screwing. All these joining methods have in common that they are complicated and expensive and/or critical with respect to the introduction of residual stress.

SUMMARY

The present invention is therefore concerned with the problem of providing improved manufacturing for a cooler, in particular for an exhaust gas recirculation cooler (EGR cooler) or charge air cooler.

This problem is solved according to the invention by the subject matter of the independent claim 1. Advantageous embodiments are subject matter of the dependent claims.

The present invention is based on the general idea to interconnect, in case of a cooler known per se which, for example, can be configured as exhaust gas recirculation cooler (EGR) or as charge air cooler and which has a first component made of a first material, preferably steel, stainless steel, ceramics or plastic, and a second component made of a second material, preferably light metal, in particular aluminum, the two mentioned components in a common connecting area via a friction stir weld joint. In friction stir welding, a rotating pin projecting out of a cylindrical shoulder is usually pressed with high force into the connecting area of the two components to be connected and is moved along a joint line. The material is heated due to the friction between the shoulder and the workpiece and is stirred by the rotation of the pin so that the two components interconnect in a hot forming process. A special joint preparation and filler materials are not required here. A great advantage of friction stir welding compared to conventional welding is that the welding temperature is always below the melting point of the light metal, that means, for example of aluminum, whereby disadvantageous micro-structural changes during solidification of the melt can be avoided. This makes it possible that also high-strength aluminum alloys, which are generally classified as being difficult to fusion-weld or only conditionally fusion-weldable, can be welded without filler material and without significant loss of strength. Moreover, the machinery requires only little investment cost. Further advantages of coolers manufactured by means of friction stir welding are high static and dynamic seam strength, no spatters, no smoke, low energy consumption, little distortion, no filler material and elimination of an otherwise required welder's qualification. The friction stir welding method is not only suitable for the connection of aluminum and steel, in particular stainless steel, but also for connections of aluminum and plastic or also for the connection of aluminum and ceramics. The selection of the material depends on the respective conditions to which the cooler is subjected. It also depends on the use and the structure of the same.

In an advantageous development of the solution according to the invention, the first component is configured as cooler shell or cooler bottom, whereas the second component is configured as a coolant nozzle, a holder, an intermediate piece or as a housing. This list indicates already that all kinds of different components of the cooler according to the invention can be connected to each other by the friction stir welding method known per se, whereby this cooler can be manufactured largely automated and thus in high quality and, at the same time, in a cost-effective manner. Due to the minimal heat input during friction stir welding there is no need to worry about introducing excessive residual stress into the cooler during welding, which can subsequently result in high load and thus also in a reduction of the expected service life of the cooler. The exact shape of the cooler is not relevant here; it has only to be ensured that at the point at which a connection of two components is generated by means of friction stir welding, the two components to be connected abut smoothly and flat on top of each other. The use according to the invention of the friction stir method known per se is not to be limited here to exhaust gas coolers and charged air cooler for vehicles; this method can of course also be used for corresponding coolers in stationary applications for cooling exhaust gases or charge air.

Further important features and advantages of the invention arise from the sub-claims, from the drawings, and from the associated description of the figures based on the drawings.

It is to be understood that the above mentioned features and the features still to be explained hereinafter are not only usable in the respective mentioned combination but also in other combinations or alone without departing from the context of the present invention.

Preferred exemplary embodiments of the invention are illustrated in the drawings and are explained in the following description in more detail, wherein identical reference numbers refer to identical, or similar, or functionally identical components.

DETAILED DESCRIPTION

Figure 1:
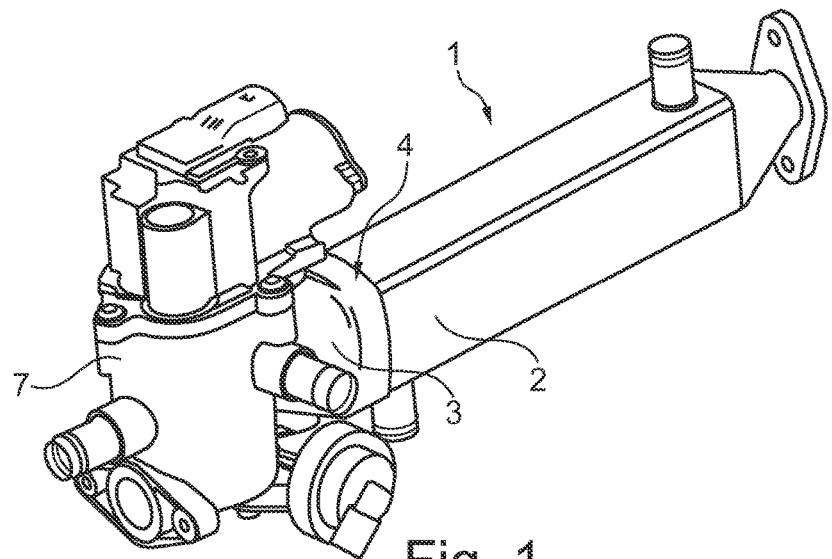
FIG. 1 shows a cooler according to the invention in one view.

According to the FIGS. 1 to 6, a cooler 1 according to the invention which can be configured, for example, as an exhaust gas recirculation cooler (EGR) or as a charge air cooler, has a first component 2 made of steel, in particular stainless steel, and a second component made of light metal, in particular aluminum, wherein according to the invention, the two components 2 and 3 are tightly connected, that is welded, to each other in a connecting area 4 by means of a friction stir weld joint. All embodiments shown of the cooler 1 according to the invention represent an I-cooler, wherein said cooler can of course also be configured as an L- or U-cooler. The first component 2 of the cooler 1 according to the invention can be configured, for example, as a cooler shell 5 or as a cooler bottom 6, whereas the second component 3 can be configured, for example, as a coolant nozzle, a holder, an intermediate piece, a housing 7 or as a diffusor 8. In FIG. 1, a housing 7 is arranged on the cooler 1, wherein in said housing 7, a valve device or flap device for controlling the exhaust gas flowing through the cooler 1 can be provided.

Figure 2:
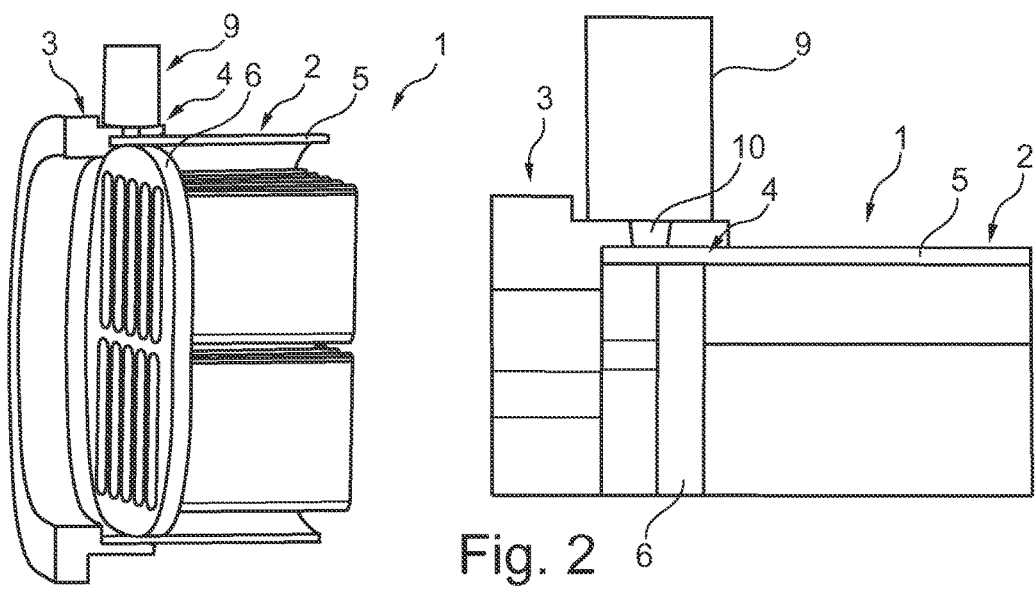
FIG. 2 shows a sectional view through the cooler according to the invention in a connecting area of two components which are connected in said connecting area by means of a friction stir weld joint.
Figure 3:
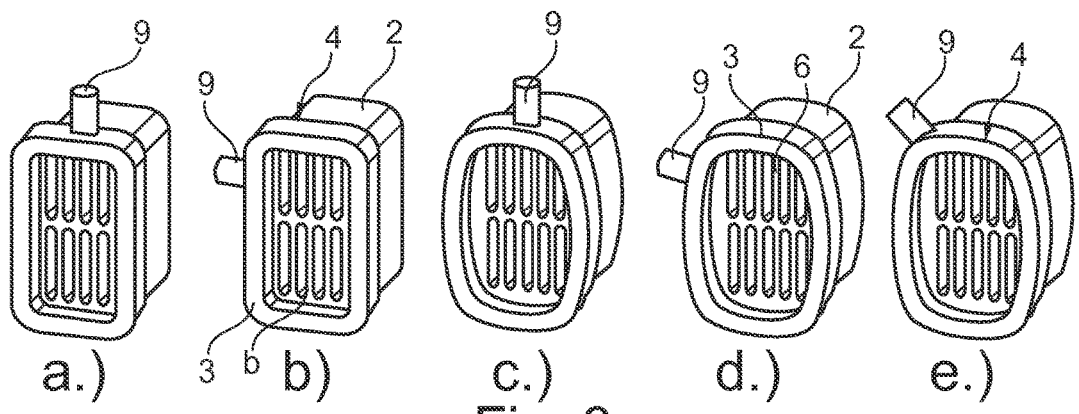
FIGS. 3a to e show different positions of a pin for generating the friction stir weld joint.

According to FIG. 2, a sectional view through the cooler 1 according to the invention shows the generation of the friction stir weld joint in the connecting area 4, for which purpose a welding device 9 with a rotating pin 10 is used. The rotating pin 10 is pressed during the welding process with high force onto the connecting area 4, whereby the material present there is kneaded. However, no melting of the components 2, 3 takes place but only a hot forming of the same, wherein the aluminum forms a diffusion bond with the stainless steel. Here, the pin 10 is pressed with a force of preferably more than 2 kN, in particular more than 5 kN onto the connecting area 4. As mentioned, the first component 2 can be made of steel, in particular stainless steel, whereas the second component 3 can be made of light metal, in particular die-cast aluminum. Depending on the requirements for durability, other material combinations can also make sense.

In FIG. 3a, the pin 10 is pressed from above onto the connecting area 4, whereas in variant 3b, the pin is arranged laterally above a channel centre. In general, the cooler bottom 6 itself which stiffens the connecting area 4 (cf. also FIG. 2) can be reinforced or is reinforced only in said connecting area 4. The cooler bottom 6 can have an angular, in particular rectangular, angular-convex or oval or round cross-sectional shape. According to the FIGS. 3c to 3e, again, different pin positions for generating the friction stir weld joint are illustrated. The exact shape of the cooler 1 is not relevant; it has only to be ensured that at the point at which a connection of two components 2, 3 is generated by means of friction stir welding, the two components 2, 3 to be connected abut smoothly and flat on top of each other as illustrated in FIG. 2.

Figure 4:
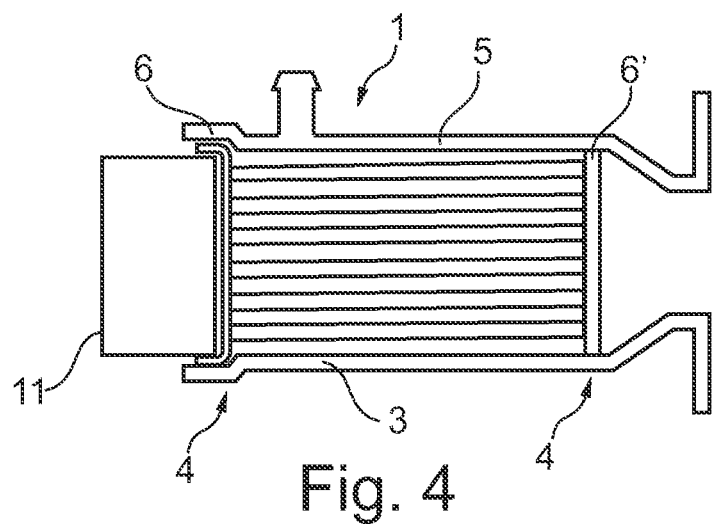
FIG. 4 shows a sectional view through a possible embodiment of a cooler according to the invention having two cooler bottoms, wherein in one cooler bottom, free space for a welding device is provided.
Figure 5:
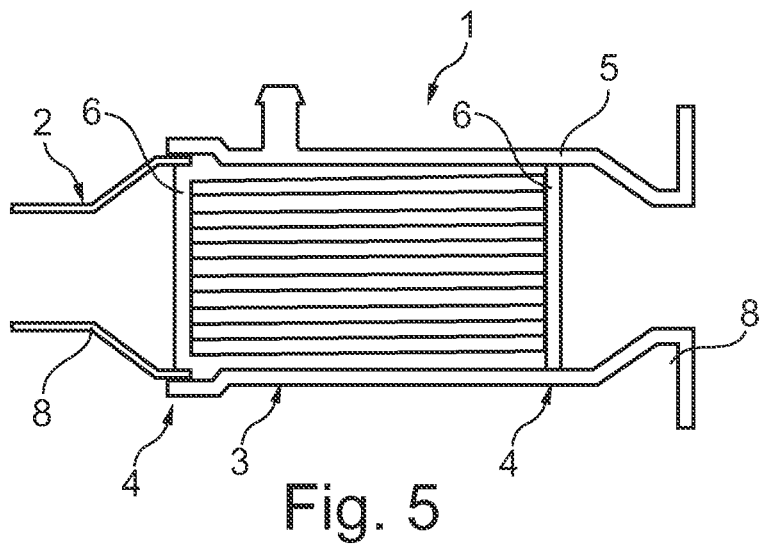
FIG. 5 shows an illustration as in FIG. 4, but with substantially the same cooler bottoms.
Figure 6:
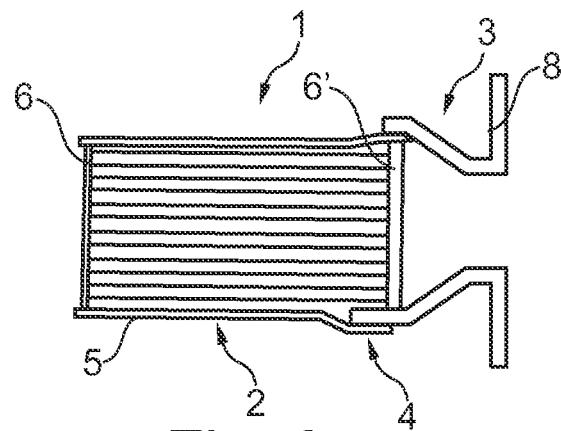
FIG. 6 shows again a sectional view through the cooler according to the invention of another embodiment in which a cooler shell is arranged partially inside and partially outside of a diffusor in the connecting area.

In the FIGS. 4 to 6, different joining variants of cooler shell 5, cooler bottom 6 and diffusor 8 are illustrated.

When viewing FIG. 4 it is apparent that on the left side of the cooler 1, a free space 11 for the welding device 9 is provided, wherein the cooler bottom 6 on the left side is considerably thinner than the reinforced cooler bottom 6' on the right side of the cooler 1. In addition, the cooler bottom 6 has a bent edge with which the cooler bottom rests flatly against the projection of the cooler shell 5 and the connection can be generated at this location by means of the friction stir welding method. Due to the bent edge, the cooler bottom 6 can be formed relatively thin compared to the cooler bottom 6'. Depending on the requirements, such a thin cooler bottom 6 can also be used on both sides of the cooler 1. If a U-shaped cooler 1 is provided, the one cooler bottom 6 can be formed in such a manner. The second component 3 is configured here as a cooler shell 5; it consists, for example, of aluminum, in particular cast aluminum, die-cast aluminum or extruded aluminum. Also, on the left side of the cooler 1, a diffusor 8 or a control valve can be arranged which will be connected via other means to the cooler 1 after the latter is completed.

An illustration similar to the one in FIG. 4 is shown in FIG. 5, wherein here on the left side of the cooler 1, a diffusor 8 is arranged which, in this case, represents the first component 2. The cooler bottom 6 is also shown as a first component 2 of the cooler 1 according to FIG. 5, wherein said cooler bottom is reinforced for implementing the friction stir welding method. Here, the cooler shell 5 encloses the diffusor 8, wherein the diffusor 8, in turn, encloses the cooler bottom 6.

Finally, two additional joining possibilities are illustrated in FIG. 6. A cooler 1 is shown, the cooler bottom 6' of which is also reinforced on the right side, whereas the cooler bottom 6 on the left side is thinner. When viewing the cooler 1 on the right side it is apparent that the diffusor 8 extends on the upper side of the cooler 1 outside of the cooler shell 5. On the lower side, an alternative connection is illustrated. Here, the diffusor 8 is arranged between the cooler shell 5 and the cooler bottom 6', i.e. that the diffusor 8 extends within the cooler shell 5 and is enclosed by the same. Here, the cooler shell 5 and the cooler bottom 6, 6' represent the first component 2, whereas the diffusor 8 represents the second component 3.

With the cooler 1 according to the invention, in case of which individual components 2 and 3 are connected to each other by means of a friction stir weld joint, essential advantages can be implemented:

the welding temperature lies below the melting point of the components 2 and 3,
high static and dynamic seam strengths can be achieved,
no spatters and no smoke are generated, this means, the method is a low-emission method,
friction stir welding saves energy
no filler material such as, for example, welding wire is required,
due to the low welding temperatures, no or only minimal distortion and only little introduction of residual stress in the components 2, 3 takes place,
the friction stir welding method can easily be automated.

The invention claimed is:

1. A composite exhaust gas recirculation cooler, comprising:
a first component made of at least one plastic and ceramic; and
a second component made of a material that is at least predominantly aluminum;
wherein the two components abut one on top of the other in a connecting area where the two components are connected to each other via a friction stir weld joint without any filler material to form a diffusion bond there between;
wherein the first component is reinforced in the connecting area and includes a cooler shell and two cooler bottoms at opposing ends of the cooler shell in an exhaust gas flow direction, and the second component is configured as at least one of a coolant nozzle and a housing; and wherein one cooler bottom is thicker than the other cooler bottom.

2. The composite exhaust gas recirculation cooler according to claim 1, wherein the cooler is configured as an I-cooler.

3. The composite exhaust gas recirculation cooler according to claim 1, wherein the cooler has at least one of a valve housing and a flap housing.

4. The composite exhaust gas recirculation cooler according to claim 1, wherein the cooler has a bypass channel.

5. The composite exhaust gas recirculation cooler according to claim 1, wherein the connecting area of the two components is stiffened by the cooler bottoms.

6. The composite exhaust gas recirculation cooler according to claim 1, wherein the cooler bottoms have at least one of a generally rectangular and oval cross-section.

7. The composite exhaust gas recirculation cooler according to claim 1, wherein the one cooler bottom is a reinforced cooler bottom.

8. The composite exhaust gas recirculation cooler according to claim 2, wherein the cooler has at least one of a valve housing and a flap housing.

9. The composite exhaust gas recirculation cooler according to claim 8, wherein the cooler has a bypass channel.

10. The composite exhaust gas recirculation cooler according to claim 9, wherein the connecting area of the two components is stiffened by the cooler bottoms.

11. The composite exhaust gas recirculation cooler according to claim 10, wherein the cooler bottoms have at least one of a generally rectangular and oval cross-section.

12. The composite exhaust gas recirculation cooler according to claim 1, wherein the cooler has a valve housing.

13. The composite exhaust gas recirculation cooler according to claim 1, wherein the cooler has a flap housing.

14. The composite exhaust gas recirculation cooler according to claim 1, wherein the second component is configured as a housing.

15. A composite exhaust gas recirculation cooler, comprising:
    a first component made of at least one of plastic and ceramic; and
    a second component made of a material that is at least predominantly aluminum;
    wherein the two components abut one on top of the other in a connecting area where the two components are connected to each other via a friction stir weld joint without any filler material;
    wherein the first component includes a cooler shell and two cooler bottoms at opposing ends of the cooler shell in an exhaust gas flow direction, and the second component is configured as at least one of a coolant nozzle and a housing; and
    wherein one cooler bottom is thicker than the other cooler bottom.

16. The composite exhaust gas recirculation cooler according to claim 1, wherein the one cooler bottom has a bent edge with which the one cooler bottom rests flatly against a projection of the cooler shell.

\* \* \* \* \*